United States Patent
Chen et al.

(10) Patent No.: US 7,701,179 B2
(45) Date of Patent: Apr. 20, 2010

(54) CONTROL CIRCUIT AND METHOD FOR MULTI-MODE BUCK-BOOST SWITCHING REGULATOR

(75) Inventors: Ke-Horng Chen, Taipei County (TW); Yung-Hsin Lin, Taipei (TW); Cheng-Ta Yu, I-Lan (TW)

(73) Assignee: Faraday Technology Corp., Hsin-Chu City (TW)

( * ) Notice: Subject to any disclaimer, the term of this patent is extended or adjusted under 35 U.S.C. 154(b) by 119 days.

(21) Appl. No.: 11/760,974

(22) Filed: Jun. 11, 2007

(65) Prior Publication Data
US 2008/0303499 A1 Dec. 11, 2008

(51) Int. Cl.
*G05F 1/24* (2006.01)
*G05F 1/575* (2006.01)

(52) U.S. Cl. .................. 323/259; 323/284; 323/288

(58) Field of Classification Search .............. 323/225, 323/259, 268, 271, 282, 284, 288, 344
See application file for complete search history.

(56) References Cited

U.S. PATENT DOCUMENTS

| 6,166,527 | A | 12/2000 | Dwelley et al. |
| 6,984,967 | B2 | 1/2006 | Notman |
| 7,116,085 | B2 * | 10/2006 | Ikezawa ............... 323/225 |
| 7,268,525 | B2 * | 9/2007 | Ishii et al. ............ 323/282 |
| 7,453,247 | B2 * | 11/2008 | de Cremoux .......... 323/285 |

* cited by examiner

*Primary Examiner*—Gary L Laxton
(74) *Attorney, Agent, or Firm*—Winston Hsu (57) ABSTRACT

A control circuit of a multi-mode buck-boost switching regulator and a method thereof are provided. The control circuit imposes ON/OFF timing sequences on switches according to the relationship between two controlling triangle waves and the load fluctuation. In each working cycle of each mode of the regulator, at most two switches perform switching operations. The control circuit is simple to design, which only includes simple digital elements, such as comparators, logic gates etc., instead of complicated analog circuits.

19 Claims, 9 Drawing Sheets

CONTROL CIRCUIT AND METHOD FOR MULTI-MODE BUCK-BOOST SWITCHING REGULATOR

BACKGROUND OF THE INVENTION

1. Field of the Invention

The present invention relates to a multi-mode buck-boost switching regulator, and more particularly, to a control circuit and a method for multi-mode buck-boost switching regulator.

2. Description of Related Art

Figure 1:
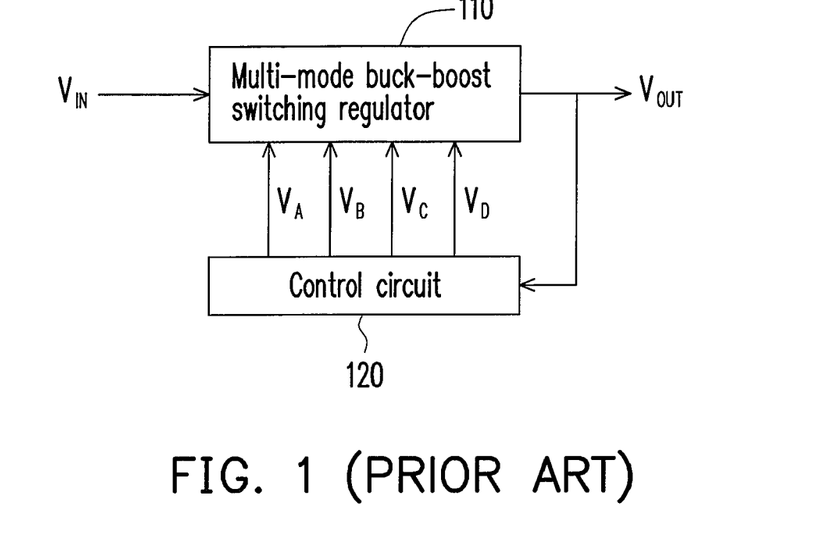
FIG. 1 is an architecture view of a conventional multi-mode buck-boost switching regulator and a control circuit thereof.

Referring to FIG. 1, FIG. 1 is an architecture view of a conventional multi-mode buck-boost switching regulator and a control circuit thereof. The multi-mode switching means three operations, including boost mode, buck mode, and buck-boost mode. As the name implies, the boost mode indicates that in a certain working cycle, the input voltage $V_{IN}$ is boosted to obtain another voltage output. The buck mode indicates that in a certain working cycle, the input voltage $V_{IN}$ is bucked to obtain another voltage output. The buck-boost mode indicates that in a certain working cycle, the input voltage $V_{IN}$ is first boosted and then bucked, or it is first bucked and then boosted to obtain another voltage output. The input voltage $V_{IN}$ is input to the multi-mode buck-boost switching regulator 110, and passes through a boost-or-buck circuit therein, so as to generate an output voltage $V_{OUT}$ for being supplied to a load. The output voltage $V_{OUT}$ is coupled to an input end of the control circuit 120. The control circuit 120 outputs four switch control signals $V_A$, $V_B$, $V_C$, and $V_D$ according to the voltage change of the output voltage $V_{OUT}$, so as to control the switching operations in the multi-mode buck-boost switching regulator 110, that is, the ON-or-OFF state of each switch, thereby controlling the operation mode and the regulation function of the multi-mode buck-boost switching regulator 110.

Figure 2:
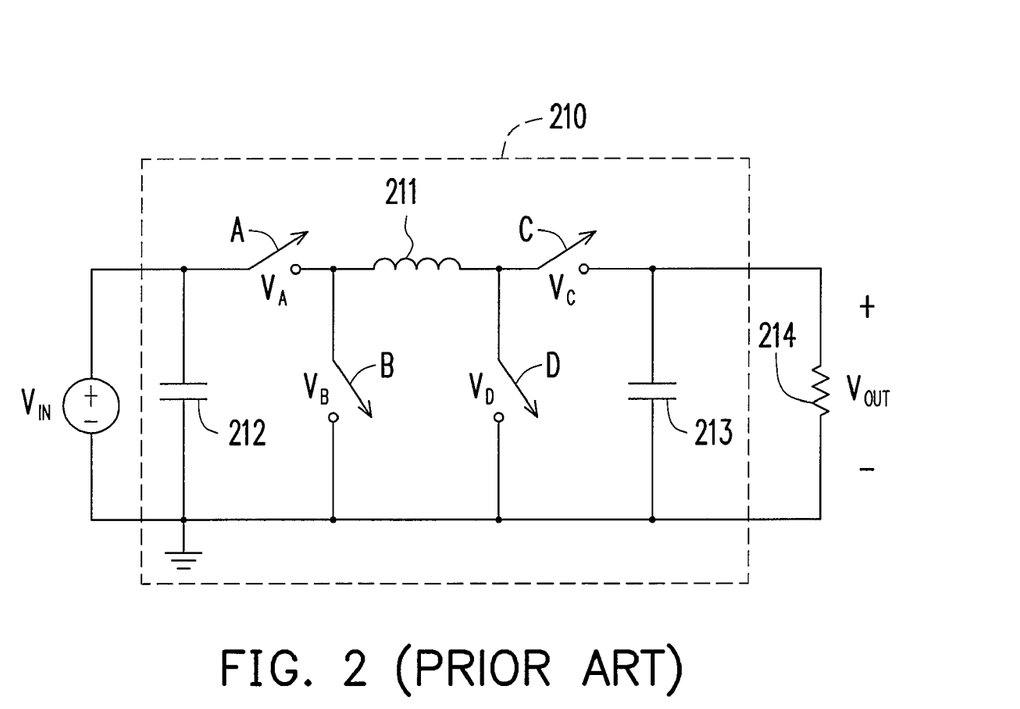
FIG. 2 is a circuit diagram of the conventional multi-mode buck-boost switching regulator.

Referring to FIG. 2, FIG. 2 is a circuit diagram of a conventional multi-mode buck-boost switching regulator, which includes an inductor 211, four switches A, B, C, and D, an input capacitor 212, and an output capacitor 213. The coupling manner of the elements is shown in FIG. 2. An output end of the multi-mode buck-boost switching regulator 210 may be connected to a load 214, and the input capacitor 212 is used for stabilizing the input voltage.

Figure 3:
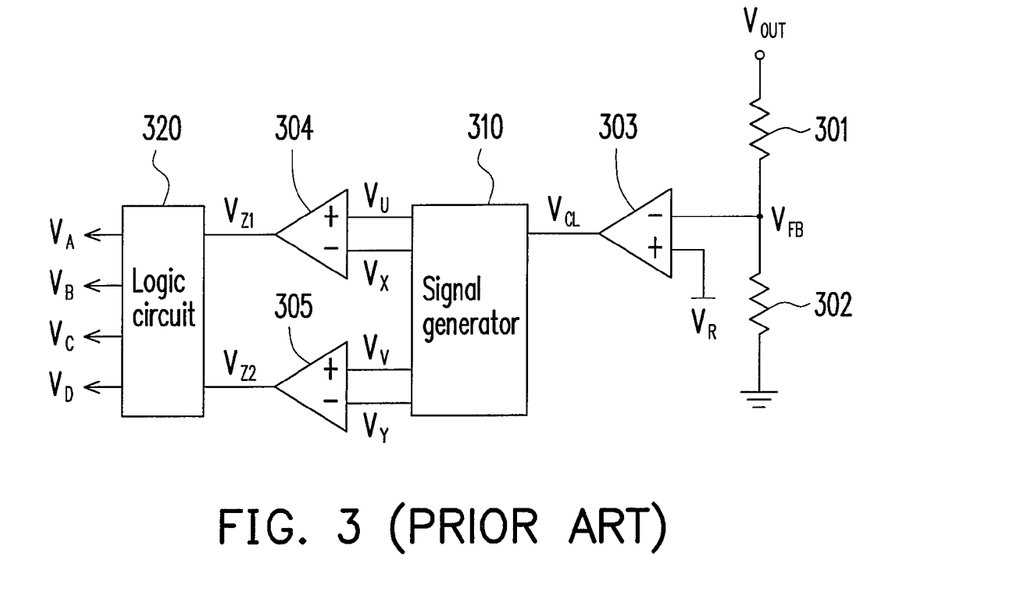
FIG. 3 is a control circuit diagram of a multi-mode buck-boost switching regulator of U.S. Pat. No. 6,166,527.

U.S. Pat. No. 6,166,527 provides a control circuit of a multi-mode buck-boost switching regulator as shown in FIG. 3, wherein resistors 301 and 302 form a voltage-dividing circuit, and a feedback voltage $V_{FB}$ is provided at a common coupling position. The feedback voltage $V_{FB}$ is reduced in direct proportion to the output voltage $V_{OUT}$, it is input to an inverting end of the comparator 303, which is compared with a reference voltage $V_R$ of a non-inverting end in terms of error, so as to obtain an output control signal $V_{CL}$. The control signal $V_{CL}$ is input to a signal generator 310, the signal generator 310 generates four output signals, wherein two signals are in direct proportion to the control signal $V_{CL}$, and they are quasi-static signals $V_U$ and $V_V$, and the other two signals are triangle wave control signals $V_X$ and $V_Y$, for determining the operation mode and the duty cycle for each switch. The quasi-static signal $V_U$ is input at the non-inverting end of the comparator 304, and the quasi-static signal $V_V$ is input at the non-inverting end of the comparator 305. The triangle wave control signal $V_X$ is input at the inverting end of the comparator 304, and the triangle wave control signal $V_Y$ is input at the inverting input of the comparator 305. The outputs of the comparators 304 and 305 are respectively state signals $V_{Z1}$ and $V_{Z2}$. Then, the state signals $V_{Z1}$ and $V_{Z2}$ are input to the logic circuit 320, so as to generate four switch control signals, which are respectively the switch control signals $V_A$, $V_B$, $V_C$, and $V_D$ for the switches A to D.

In the multi-mode buck-boost switching regulator of the U.S. Pat. No. 6,166,527, the control circuit of FIG. 3 and the the multi-mode buck-boost switching regulator of FIG. 2 are used to control the switching operations according to the voltage change of the load 214, so as to form the operation modes of boost, buck, and buck-boost. The operation mode is determined by the relative position of the control signal $V_{CL}$ at the two triangle wave control signals $V_X$ and $V_Y$. In the boost mode, the switch A is ON, the switch B is OFF, and only switches C and D perform the switching operation of ON and OFF. In the buck mode, the switch C is ON, the switch D is OFF, and only switches A and B perform the switching operation of ON and OFF. The disadvantage is that, in the buck-boost mode, in a single working cycle, that is, in a signal cycle of the triangle wave control signals $V_X$ and $V_Y$, all the four switches A, B, C, and D perform the switching operation of ON and OFF. So the efficiency is very low.

Figure 4:
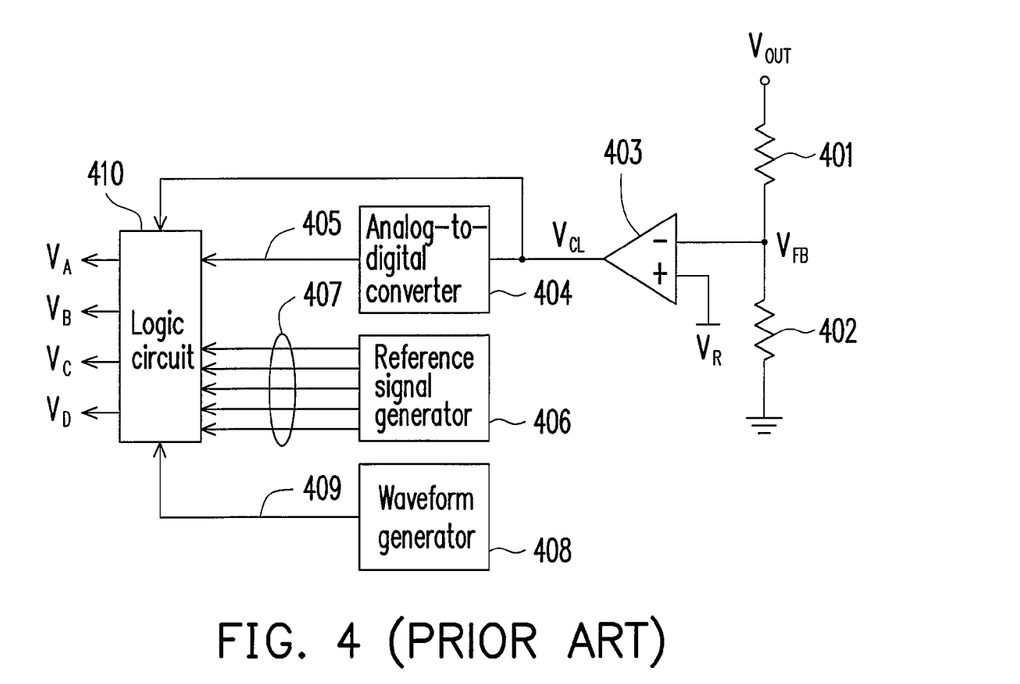
FIG. 4 is a control circuit diagram of a multi-mode buck-boost switching regulator of U.S. Pat. No. 6,984,967.

U.S. Pat. No. 6,984,967 provides a control circuit of a multi-mode buck-boost switching regulator as shown in FIG. 4, wherein the resistors 401 and 402 form a voltage-dividing circuit, and a feedback voltage $V_{FB}$ is provided at the common coupling position. The feedback voltage $V_{FB}$ is reduced in direct proportion to the output voltage $V_{OUT}$, and it is input to an inverting end of the comparator 403, which is compared with a reference voltage $V_R$ of a non-inverting end, so as to obtain an output control signal $V_{CL}$. The control signal $V_{CL}$ is input to an analog-to-digital converter 404 to obtain a digital control signal 405. The reference signal generator 406 outputs a group of five precise reference voltage signals 407. A waveform generator 408 outputs a triangle wave control signal 409. The logic circuit 410 receives each signal input including the control signal $V_{CL}$, the five precise reference voltage signals 407, the digital control signal 405, and the triangle wave control signal 409, etc., and then generates four switch control signals, which are respectively switch control signals $V_A$, $V_B$, $V_C$, and $V_D$ for the switches A to D.

In the multi-mode buck-boost switching regulator 210 shown in FIG. 2, when the circuit of FIG. 4 is used as the control circuit, only one triangle wave control signal 409 is used to control the switching. The operation mode is determined by the position of the digital control signal 405 in the precise reference voltage signals 407. The advantage of the control circuit lies in that, during the process of boost, buck, or buck-boost, in a signal working cycle, there are only two switches in action, and the other two switches continuously maintain to be ON or OFF. So the efficiency is relatively high. On the other hand, the disadvantage lies in that, the circuit is complicated, and because a lot of reference voltages are required to be generated, the process is difficult to control. Another disadvantage is that, the time point for the switching of the switch is determined according to the comparison between the triangle wave control signal 409 and the precise reference voltage signals 407, so the duty cycle of the switch is fixed, and the control signal $V_{CL}$ of the comparator 403 is not used to determine the time point for the switching of the switch, so it cannot be quickly and finely adjusted according to the fluctuation of the load 214, and thus, only several fixed operation modes exist, which does not meet the requirement of sensitivity.

SUMMARY OF THE INVENTION

Accordingly, the present invention provides a control circuit of a multi-mode buck-boost switching regulator, which has an advantage that it is easy to be designed, and at most only two switches are required to be driven in each working cycle, without operations of all the switches, so as to improve the efficiency of the regulator.

The present invention also provides a method of controlling a multi-mode buck-boost switching regulator, which has an advantage that whenever the output voltage of the regulator changes, the duty cycle of the switch is changed accordingly, which is sensitively and finely adjusted according to the load change.

The present invention provides a control circuit of a multi-mode buck-boost switching regulator. The multi-mode buck-boost switching regulator comprises a first switch, a second switch, a third switch, a fourth switch, an inductor, and a capacitor. The first switch receives an input voltage, the second switch is coupled between the first switch and a ground terminal, the inductor is coupled to the first switch and the second switch, the fourth switch is coupled between the inductor and the ground terminal, the third switch is coupled to the inductor and the fourth switch, the capacitor is coupled between the third switch and the ground terminal, which provides an output voltage of the multi-mode buck-boost switching regulator. The control circuit comprises a comparator, a triangle wave generator and a logic circuit. The comparator outputs a control signal according to an error between a feedback voltage and a reference voltage, the feedback voltage is generated according to the output voltage, and it is in direct proportion to the output voltage. The triangle wave generator provides a first triangle wave and a second triangle wave, at a first time point, the first triangle wave is larger than the second triangle wave, and at a second time point, the first triangle wave is smaller than the second triangle wave. The logic circuit controls the switching timing of the first switch, the second switch, the third switch, and the fourth switch according to a comparing result between the control signal, the first triangle wave, and the second triangle wave.

In an embodiment, the control circuit of the multi-mode buck-boost switching regulator further comprises a voltage-dividing circuit, for receiving the output voltage, and providing a voltage division of a preset ratio of the output voltage as the feedback voltage. The comparator amplifies the error between the feedback voltage and the reference voltage, and outputs the amplified error as the control signal.

In an embodiment, in the triangle wave generator of the control circuit of the multi-mode buck-boost switching regulator, the cycle of the first triangle wave is the same as that of the second triangle wave. The slope of the first triangle wave is a positive value, and the slope of the second triangle wave is a negative value. The maximum value of the first triangle wave is larger than that of the second triangle wave, the maximum value of the second triangle wave is larger than an average value of the first triangle wave and the second triangle wave, the average value is larger than the minimum value of the first triangle wave, and the minimum value of the first triangle wave is larger than that of the second triangle wave.

In an embodiment, as for the control circuit of the multi-mode buck-boost switching regulator, if the control signal is larger than the average value, the logic circuit turns on the first switch, and turns off the second switch, and makes the third switch and the fourth switch to alternately switch between ON and OFF. If the control signal is equal to the average value, the logic circuit turns on the first switch and the third switch, and turns off the second switch and the fourth switch. If the control signal is smaller than the average value, the logic circuit turns on the third switch, turns off the fourth switch, and makes the first switch and the second switch to alternately switch between ON and OFF.

Under the circumstance that the control signal is larger than the maximum value of the second triangle wave, if the control signal is larger than the first triangle wave, the logic circuit turns on the fourth switch, and turns off the third switch. If the control signal is smaller than the first triangle wave, the logic circuit turns on the third switch, and turns off the fourth switch.

Under the circumstance that the control signal is between the maximum value of the second triangle wave and the average value, if the control signal is larger than the first triangle wave and the second triangle wave, the logic circuit turns on the fourth switch, and turns off the third switch. If the control signal is smaller than the first triangle wave or the second triangle wave, the logic circuit turns on the third switch, and turns off the fourth switch.

Under the circumstance that the control signal is between the average value and the minimum value of the first triangle wave, if the control signal is smaller than the first triangle wave and the second triangle wave, the logic circuit turns on the second switch, and turns off the first switch. If the control signal is larger than the first triangle wave or the second triangle wave, the logic circuit turns on the first switch, and turns off the second switch.

Under the circumstance that the control signal is smaller than the minimum value of the first triangle wave, if the control signal is smaller than the second triangle wave, the logic circuit turns on the second switch, and turns off the first switch. If the control signal is larger than the second triangle wave, the logic circuit turns on the first switch, and turns off the second switch.

The present invention further provides a method of controlling the multi-mode buck-boost switching regulator. The multi-mode buck-boost switching regulator comprises a first switch, a second switch, a third switch, a fourth switch, an inductor, and a capacitor. The first switch receives an input voltage, the second switch is coupled between the first switch and a ground terminal, the inductor is coupled to the first switch and the second switch, the fourth switch is coupled between the inductor and the ground terminal, the third switch is coupled to the inductor and the fourth switch, the capacitor is coupled between the third switch and the ground terminal, which provides an output voltage of the multi-mode buck-boost switching regulator. The controlling method comprises the following steps. Firstly, a control signal is generated according to an error between a feedback voltage and a reference voltage, and the feedback voltage is generated according to the output voltage, which is in direct proportion to the output voltage. Next, a first triangle wave and a second triangle wave are provided, wherein at a first time point, the first triangle wave is larger than the second triangle wave, and at a second time point, the first triangle wave is smaller than the second triangle wave. The switching timing of the first switch, the second switch, the third switch, and the fourth switch is controlled according to a comparing result between the control signal, the first triangle wave, and the second triangle wave.

In the above control circuit and the controlling method of the multi-mode buck-boost switching regulator, in a single cycle of the first triangle wave and the second triangle wave, at most two switches perform switching operations, so the efficiency of the regulator is relatively high, which solves the problem of U.S. Pat. No. 6,166,527 that all the four switches in one working cycle perform switching operations in the buck-boost mode. Meanwhile, in the buck-boost mode, as the level of the control signal changes, the duty cycles of the switches are changed accordingly. Therefore, the multi-mode buck-boost switching regulator is relatively sensitive, thus solving the problem of the U.S. Pat. No. 6,984,967. In the present invention, the advantages of the two conventional art are combined, and the two disadvantages of the conventional art are avoided. The design and the logic rule of the present invention are very simple. It is easy to use simple digital elements such as comparators and logic gates to form the logic circuit of the present invention for controlling the switch, which does not require the complicated analog circuits as that of the U.S. Pat. No. 6,984,967.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 5:
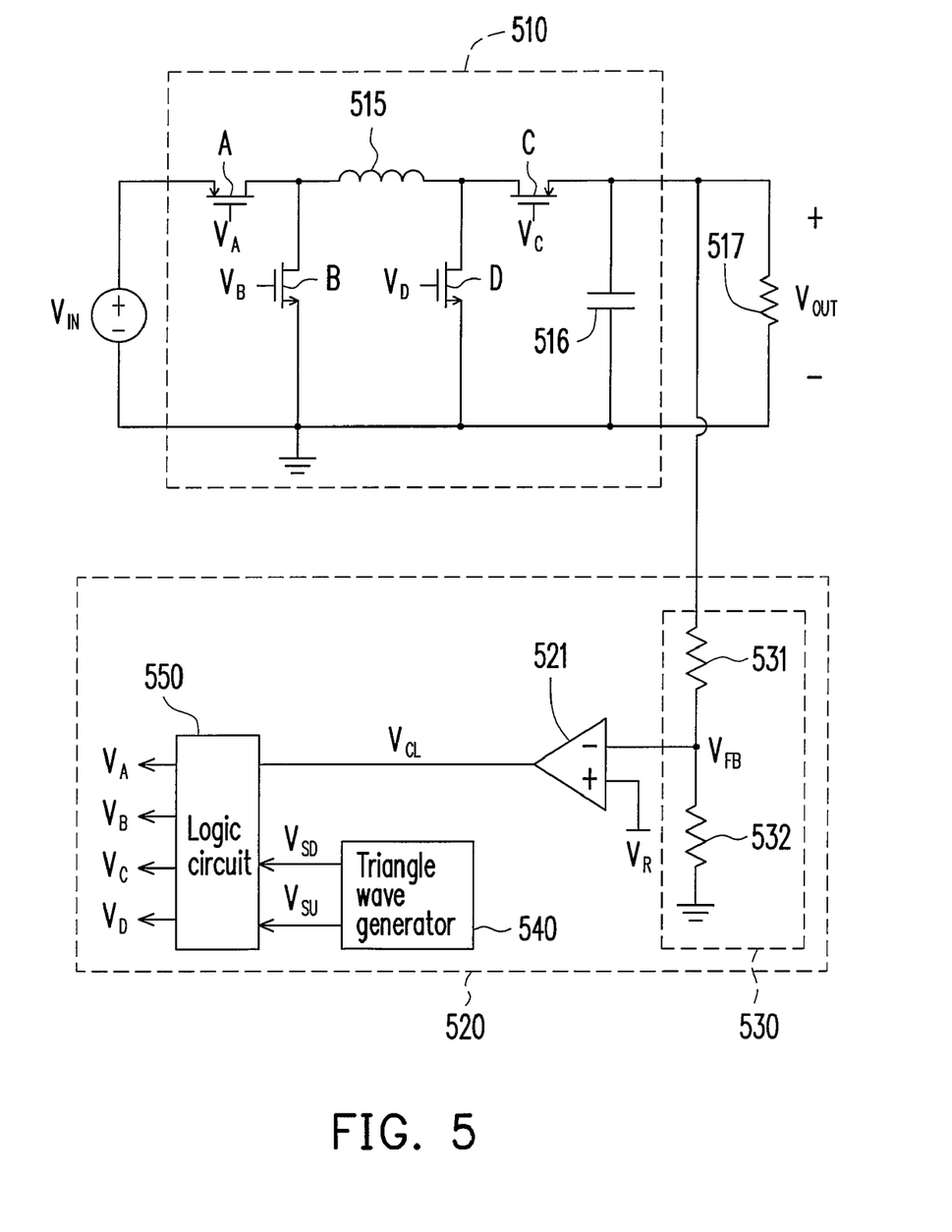
FIG. 5 is a diagram of a multi-mode buck-boost switching regulator and a control circuit thereof according to an embodiment of the present invention.

FIG. 5 shows a multi-mode buck-boost switching regulator 510 and a control circuit 520 thereof of an embodiment of the present invention. The multi-mode buck-boost switching regulator 510 includes switches A, B, C, and D, an inductor 515, and an output capacitor 516. The switch A receives an input voltage $V_{IN}$, the switch B is coupled between the switch A and the ground terminal, the inductor 515 is coupled to the switch A and the switch B, the switch D is coupled between the inductor 515 and the ground terminal, the switch C is coupled to the inductor 515 and the switch D, and the output capacitor 516 is coupled between the switch C and the ground terminal, which provides an output voltage $V_{OUT}$ of the multi-mode buck-boost switching regulator 510 to the load 517.

The control circuit 520 includes a comparator 521, a triangle wave generator 540, a logic circuit 550, and a voltage-dividing circuit 530. The comparator 521 outputs a control signal $V_{CL}$ according to an error between a feedback voltage $V_{FB}$ and a reference voltage $V_R$, the feedback voltage $V_{FB}$ is generated according to the output voltage $V_{OUT}$, and the feedback voltage $V_{FB}$ is in direct proportion to the output voltage $V_{OUT}$. The triangle wave generator 540 provides triangle wave control signals $V_{SU}$ and $V_{SD}$. The two triangle waves have a mutually crossed relation, for example, at a certain time point, the triangle wave control signal $V_{SU}$ is larger than $V_{SD}$, and at another time point, the triangle wave control signal $V_{SU}$ is smaller than $V_{SD}$. The logic circuit 550 controls the switching timing of the switches A, B, C, and D according to the comparing result between the control signal $V_{CL}$ and the triangle wave control signals $V_{SU}$ ad $V_{SD}$.

In a preferred embodiment of the present invention, the switches A, B, C, and D are implemented as metal-oxide semiconductor field effect transistors (MOSFETs). The voltage-dividing circuit 530 includes resistors 531 and 532, the resistor 531 is coupled to an output voltage $V_{OUT}$ end of the multi-mode buck-boost switching regulator 510, and then connected to the resistor 532 in series, and then connected to the ground. The voltage at the coupling positions of the two resistors 531 and 532 may be divided in direct proportion to the output voltage $V_{OUT}$, which becomes the feedback voltage $V_{FB}$. The error between the feedback voltage $V_{FB}$ and the reference voltage $V_R$ is amplified by the comparator 521, and then output as the control signal $V_{CL}$.

Figure 6:
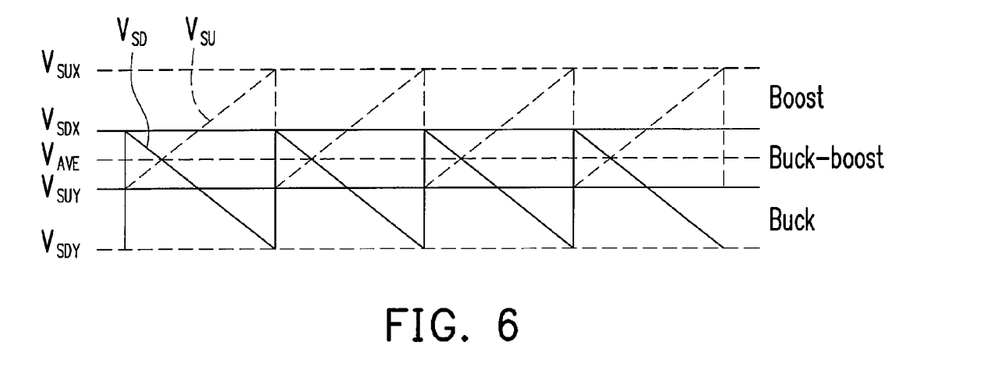
FIG. 6 is a relationship diagram of two triangle wave control signals used in an embodiment of the present invention.

FIG. 6 is a relationship diagram of two triangle wave control signals according to an embodiment of the present invention. As shown in FIG. 6, the cycles of the triangle wave control signals $V_{SU}$ and $V_{SD}$ are the same. The slope of the triangle wave control signal $V_{SU}$ is a positive value, and the slope of the triangle wave control signal $V_{SD}$ is a negative value. The maximum value $V_{SUX}$ of the triangle wave control signal $V_{SU}$ is larger than the maximum value $V_{SDX}$ of the triangle wave control signal $V_{SD}$, the maximum value $V_{SDX}$ of the triangle wave control signal $V_{SD}$ is larger than an average value $V_{AVE}$ of the triangle wave control signals $V_{SU}$ and $V_{SD}$, the average value $V_{AVE}$ is larger than the minimum value $V_{SUY}$ of the triangle wave control signal $V_{SU}$, and the minimum value $V_{SUY}$ of the triangle wave control signal $V_{SU}$ is larger than the minimum value $V_{SDY}$ of the triangle wave control signal $V_{SD}$. The logic circuit 550 compares the control signal $V_{CL}$ (not shown) with the triangle wave control signals $V_{SU}$ and $V_{SD}$. When the control signal $V_{CL}$ is larger than $V_{SDX}$, the logic circuit 550 makes the multi-mode buck-boost switching regulator 510 be operated at the boost mode. When the control signal $V_{CL}$ falls within the interval between the $V_{SDX}$ and $V_{SUY}$, the logic circuit 550 makes the multi-mode buck-boost switching regulator 510 be operated at the buck-boost mode. When the control signal $V_{CL}$ is smaller than $V_{SUY}$, the logic circuit 550 makes the multi-mode buck-boost switching regulator 510 be operated at the buck mode.

In a preferred embodiment of the present invention, when the control signal $V_{CL}$ is larger than the average value $V_{AVE}$, the logic circuit 550 (shown in FIG. 5) makes the multi-mode buck-boost switching regulator 510 perform the boosting operation, that is, the switch A is turned on, the switch B is turned off, and the switches C and D perform ON/OFF switching. If the control signal $V_{CL}$ is equal to the average value $V_{AVE}$, the logic circuit 550 makes the input voltage $V_{IN}$ directly output to be an output voltage $V_{OUT}$, that is, the switches A and C are turned on, and the switches B and D are turned off. If the control signal $V_{CL}$ is smaller than the average value $V_{AVE}$, the logic circuit 550 makes the multi-mode buck-boost switching regulator 510 perform the bucking operation, that is, the switch C is turned on, the switch D is turned off, and the switches A and B perform ON/OFF switching.

Particularly, the switching timing of the switch may be divided into five situations. FIGS. 7 to 11 are timing control diagrams of the switches under different situations according to an embodiment of the present invention. How to use the control circuit to control the switching operations of each switch is illustrated with reference to the drawings.

Figure 7:
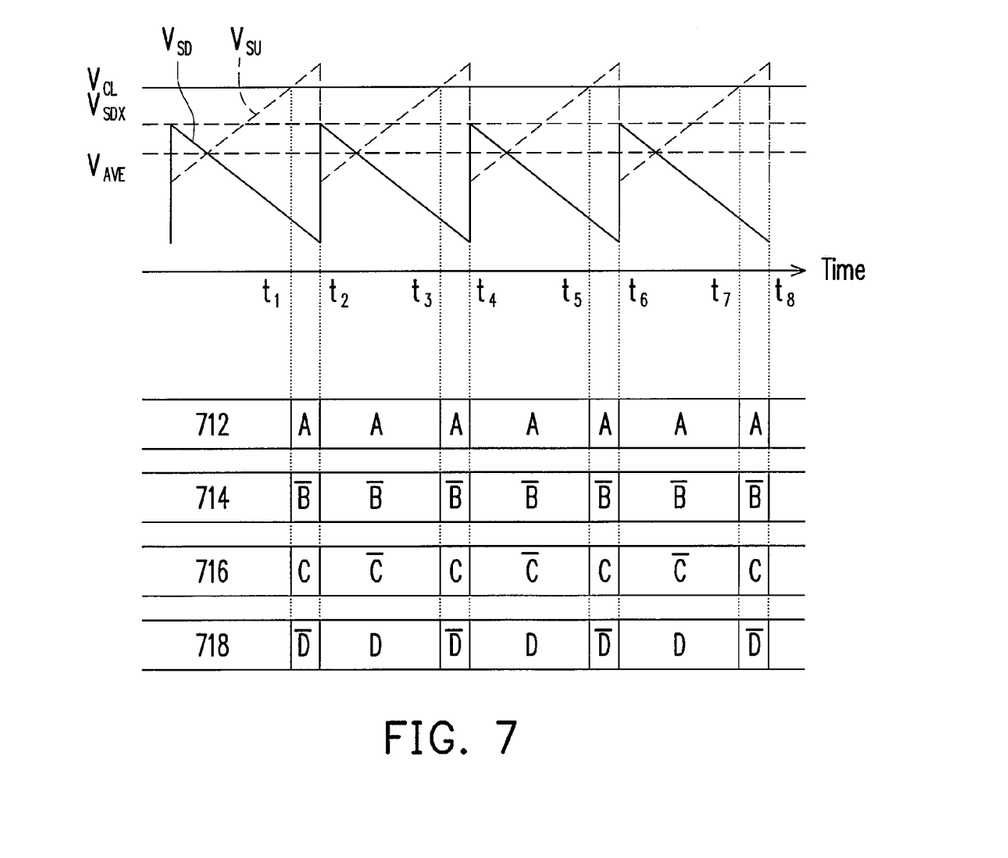
FIGS. 7 to 11 are timing control diagrams of the switches under different situations according to an embodiment of the present invention.

FIG. 7 is a timing control diagram of switches according to an embodiment of the present invention. Because the control signal $V_{CL}$ is larger than the average value $V_{AVE}$, the logic circuit 550 turns on the switch A of FIG. 5, turns off the switch B, and makes the switches C and D to alternately switch between ON/OFF. Under the circumstance that the control signal $V_{CL}$ is larger than the maximum value $V_{SDX}$ of the triangle wave control signal $V_{SD}$, if the control signal $V_{CL}$ is larger than the triangle wave control signal $V_{SU}$, the logic circuit 550 turns on the switch D, and turns off the switch C. Under the circumstance that the control signal $V_{CL}$ is larger than the maximum value $V_{SDX}$ of the triangle wave control signal $V_{SD}$, if the control signal $V_{CL}$ is smaller than the triangle wave control signal $V_{SU}$, the logic circuit 550 turns on the switch C, and turns off the switch D.

Four switch timing state rows 712 to 718 respectively indicate the switching operations of the switches A to D. A letter is used to indicate that the switch is ON, and a letter with a dash thereon is used to indicate that the switch is OFF (for example, "A" indicates that the switch A is ON, and "$\overline{A}$" indicates that the switch A is OFF). In the drawing, the crossed time points of the control signal $V_{CL}$ and the triangle wave 701 are t1 to t8. Between t1 and t2, A indicates that the switch A is ON, $\overline{B}$ indicates that the switch B is OFF, C indicates that the switch C is ON, and $\overline{D}$ indicates that the switch D is OFF. Between t2 and t3, A indicates that the switch A is ON, $\overline{B}$ indicates that the switch B is OFF, $\overline{C}$ indicates that the switch C is OFF, and D indicates that the switch D is ON. The switching operation states of other time intervals t3-t4, t4-t5, t5-t6, t6-t7, and t7-t8 are as marked in the drawing. As shown in the figure, taking any cycle interval of the periodically changed triangle wave control signal $V_{SU}$ on the drawing as an example, only two switches have switching operations, in other words, the time from t2 to t4 is taken as an example, only switches C and D have the switching operations, and the time from t4 to t6 is taken as an example, only switches C and D have the switching operations.

Figure 8:
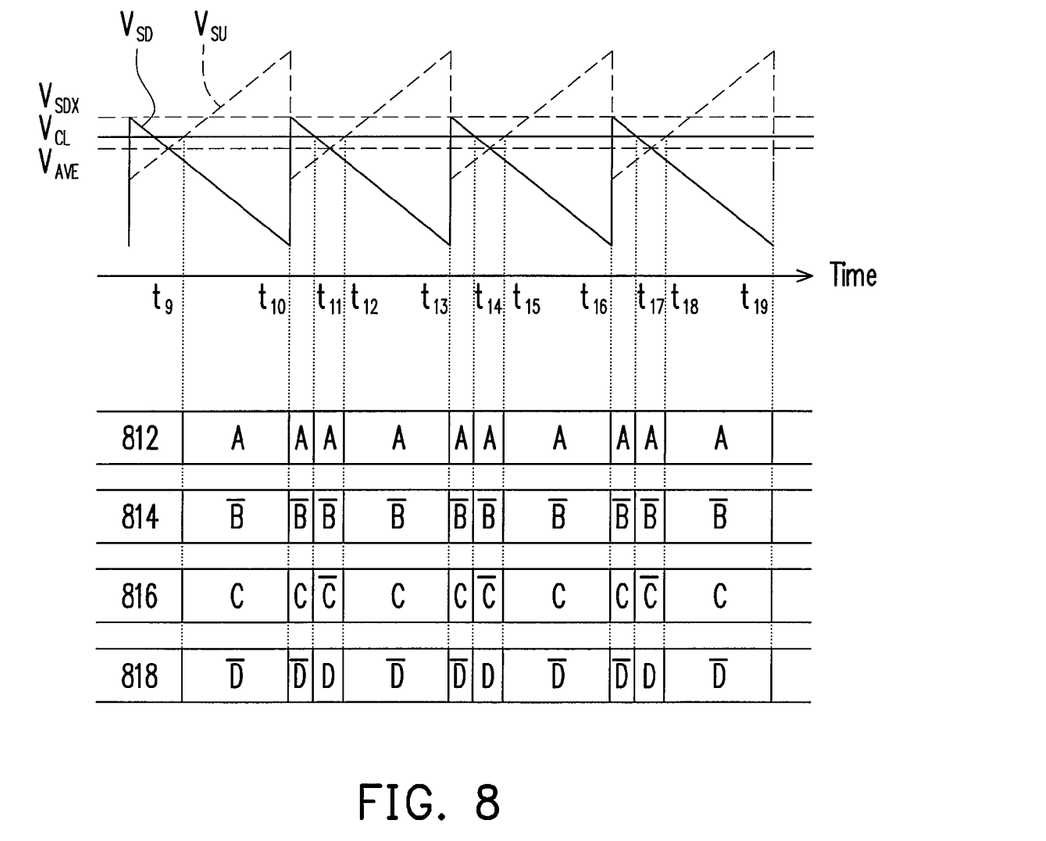

FIG. 8 is a timing control diagram of switches under a first buck-boost mode according to an embodiment of the present invention. Because the control signal $V_{CL}$ is larger than the average value $V_{AVE}$, the logic circuit 550 turns on the switch A shown in FIG. 5, turns off the switch B, and makes switches C and D to alternately switch between ON/OFF. Under the circumstance that the control signal $V_{CL}$ falls between the maximum value $V_{SDX}$ of the triangle wave control signal $V_{SD}$ and the average value $V_{AVE}$, if the control signal $V_{CL}$ is larger than the triangle wave control signals $V_{SU}$ and $V_{SD}$, the logic circuit 550 turns on the switch D, and turns off the switch C. Under the circumstance that the control signal $V_{CL}$ falls between the maximum value $V_{SDX}$ of the triangle wave control signal $V_{SD}$ and the average value $V_{AVE}$, if the control signal $V_{CL}$ is smaller than the triangle wave control signal $V_{SU}$ or $V_{SD}$, the logic circuit 550 turns on the switch C, and turns off the switch D.

Four switch timing state rows 812-818 respectively indicate the states of switches A to D. The crossed time points of the control signal $V_{CL}$ and the periodically changed triangle wave control signal $V_{SU}$ are t9, t10, t12, t13, t15, t16, t18, and t19. The crossed time points of the control signal $V_{CL}$ and another periodically changed triangle wave control signal $V_{SD}$ are t10, t11, t13, t14, t16, and t17. The switching operation state of each time interval is as marked in the drawing, the triangle wave in any cycle is randomly selected on the drawing, and the cycle from crossed time points of t10 to t13 of the control signal $V_{CL}$ is taken as an example, a cycle is divided into three intervals, namely, the interval between t10 and t11, A is used to indicate that the switch A is ON, $\overline{B}$ is used to indicate that the switch B is OFF, C is used to indicate that the switch C is ON, and $\overline{D}$ is used to indicate that the switch D is OFF; the interval between t11 and t12, A is used to indicate that the switch A is ON, $\overline{B}$ is used to indicate that the switch B is OFF, $\overline{C}$ is used to indicate that the switch C is OFF, and D is used to indicate that the switch D is ON; the interval between t12 and t13, the switching state is the same as t10 to t11. As known from the switching state on the drawing, only the switch C or D switches, in each working cycle, only two switches have the switching operations.

Figure 9:
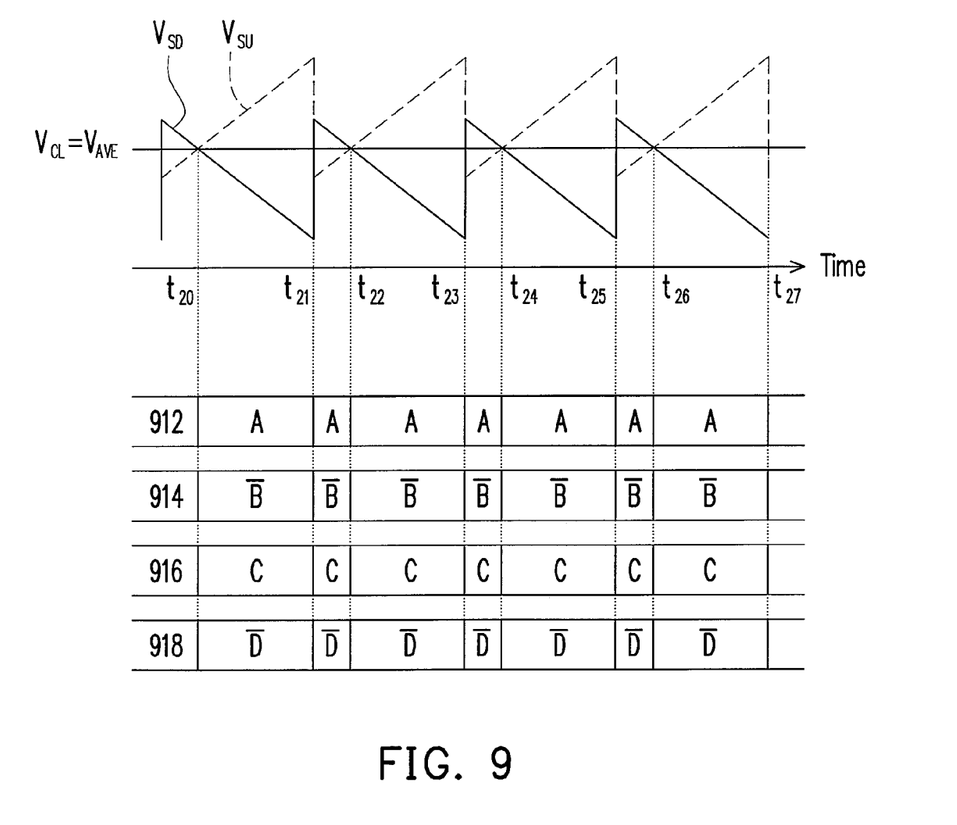

FIG. 9 is a timing controlling diagram of the switches under a second buck-boost mode according to an embodiment of the present invention. The control signal $V_{CL}$ in the drawing is equal to the average value $V_{AVE}$, the logic circuit 550 makes the input voltage $V_{IN}$ be directly outputted as the output voltage $V_{OUT}$, that is, the logic circuit 550 turns on the switches A and C, and turns off the switches B and D. Four switch timing state rows 912-918 respectively indicate the states of the switches A to D. In the drawing, the common crossed time points of the control signal $V_{CL}$ and two periodically changed triangle wave control signals $V_{SU}$ and $V_{SD}$ are t20 to t27. The switching operations of the switches in each time interval is as marked in the drawing, a triangle wave in any cycle is randomly selected in the drawing, the cycle of the crossed time points t23 to t25 of the control signal $V_{CL}$ is taken as an example, the cycle is divided into two intervals, namely, the interval between t23 and t24, A is used to indicate the switch A is ON, $\overline{B}$ is used to indicate that the switch B is OFF, C is used to indicate that the switch C is ON, and $\overline{D}$ is used to indicate that the switch D is OFF; the interval between t24 and t25, A is used to indicate the switch A is ON, $\overline{B}$ is used to indicate that the switch B is OFF, C is used to indicate that the switch C is ON, and $\overline{D}$ is used to indicate that the switch D is OFF. In FIG. 9, each working cycle has no switching operations, and the input voltage $V_{IN}$ is the same as the output voltage $V_{OUT}$.

Figure 10:
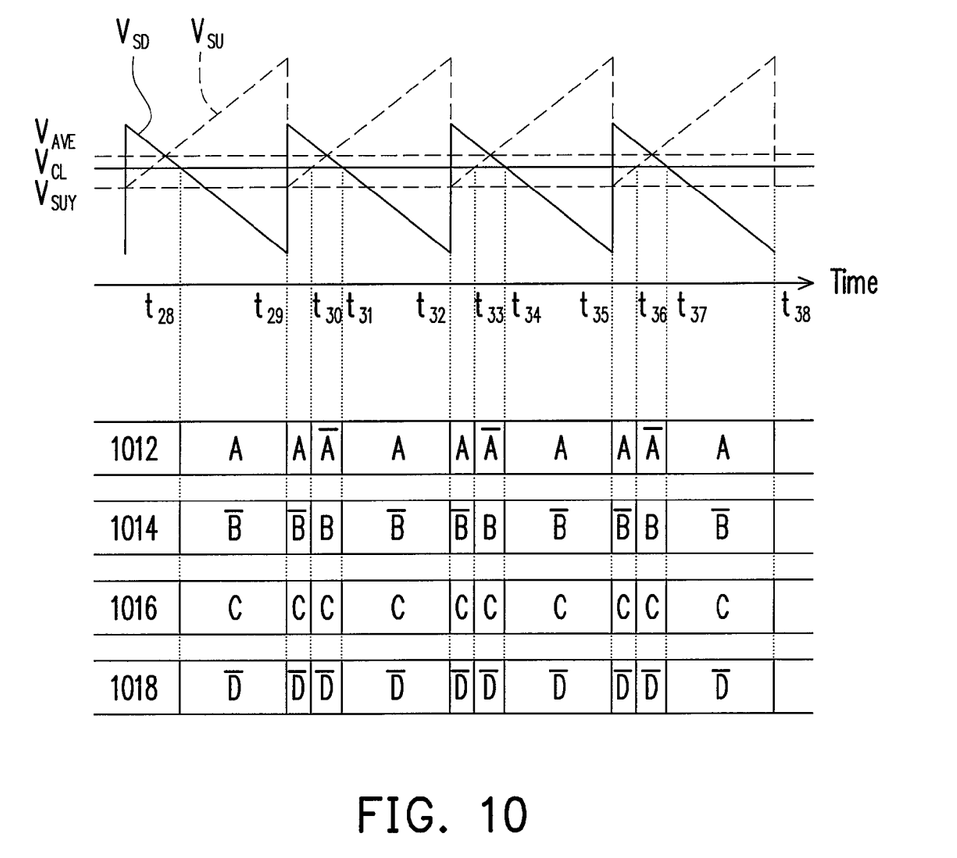

FIG. 10 is a timing controlling diagram of the switches under a third buck-boost mode according to an embodiment of the present invention. Four switch timing state rows 1012-1018 respectively indicate the state of the switches A to D. Because the control signal $V_{CL}$ is smaller than the average value $V_{AVE}$, the logic circuit 550 turns on the switch C of FIG. 5, turns off the switch D, and makes the switches A and B to alternately switch between ON/OFF. Under the circumstance that the control signal $V_{CL}$ falls between the average value $V_{AVE}$ and the minimum value $V_{SUY}$ of the triangle wave control signal $V_{SU}$, if the control signal $V_{CL}$ is smaller than the triangle wave control signals $V_{SU}$ and $V_{SD}$, the logic circuit 550 turns on the switch B, and turns off the switch A. Under the circumstance that the control signal $V_{CL}$ falls between the average value $V_{AVE}$ and the minimum value $V_{SUY}$ of the triangle wave control signal $V_{SU}$, if the control signal $V_{CL}$ is larger than the triangle wave control signal $V_{SU}$ or $V_{SD}$, the logic circuit 550 turns on the switch A, and turns off the switch B. The crossed time points of the control signal $V_{CL}$ and a periodically changed triangle wave control signal $V_{SU}$ are t29, t30, t32, t33, t35, t36, and t38. The crossed time points of the control signal $V_{CL}$ and another periodically changed triangle wave control signal $V_{SD}$ are t28, t29, t31, t32, t34, t35, t37, and t38. The switching state of each time interval is indicated in the drawing, a triangle wave in any cycle is randomly selected on the drawing, and the cycle of the crossed time points t29 to t32 of the control signal $V_{CL}$ is taken as an example, a cycle is divided into three intervals, namely, an interval between t29 and t30, A is used to indicate that the switch A is ON, $\overline{B}$ is used to indicate that the switch B is OFF, C is used to indicate that the switch C is ON, and $\overline{D}$ is used to indicate that the switch D is OFF; a interval between t30 and t31, $\overline{A}$ is used to indicate that the switch A is OFF, B is used to indicate that the switch B is ON, C is used to indicate that the switch C is ON, and $\overline{D}$ is used to indicate that the switch D is OFF; and one interval between t31 and 32, the switch state is the same as that between t29 and t30. From the switching state in the drawing, only the switch A or B switches, in each working cycle, only two switches have the switching operations.

Figure 11:
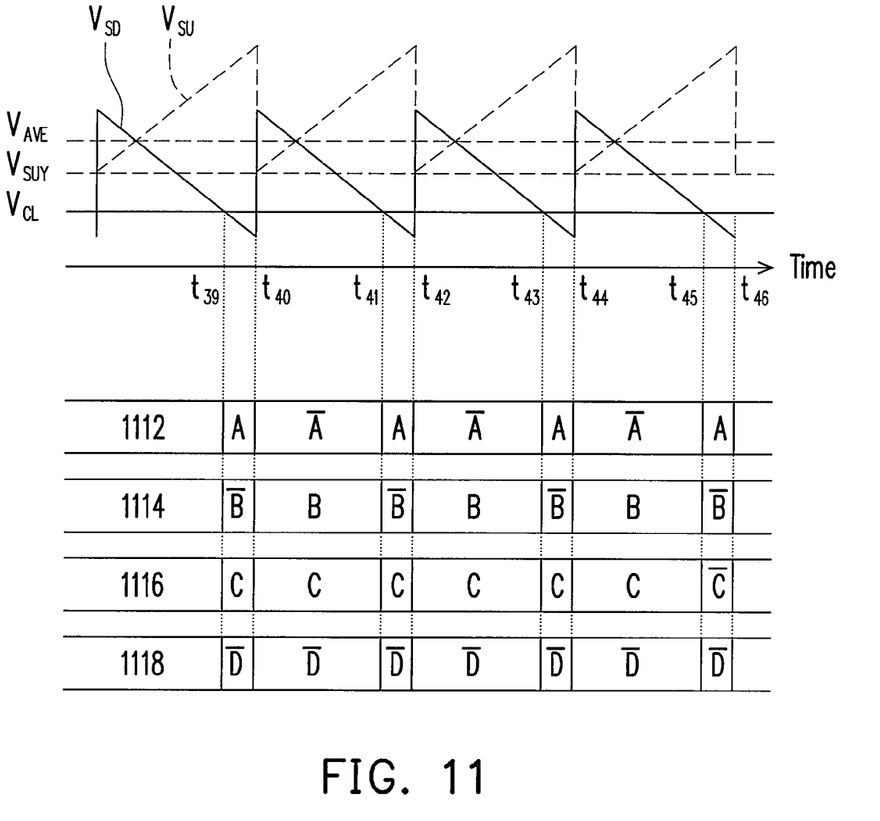

FIG. 11 is a timing controlling diagram of the switches under a bucking mode according to an embodiment of the present invention. Because the control signal $V_{CL}$ is smaller than the average value $V_{AVE}$, the switch C shown in FIG. 5 is turned on, the switch D is turned off, and the switches A and B are made to alternately switch between ON/OFF. Under the circumstance that the control signal $V_{CL}$ is smaller than the minimum value $V_{SUY}$ of the triangle wave control signal $V_{SU}$, if the control signal $V_{CL}$ is smaller than the triangle wave control signal $V_{SD}$, the logic circuit 550 turns on the switch B, and turns off the switch A. Under the circumstance that the control signal $V_{CL}$ is smaller than the minimum value $V_{SUY}$ of the triangle wave control signal $V_{SU}$, if the control signal $V_{CL}$ is larger than the triangle wave control signal $V_{SD}$, the logic circuit 550 turns on the switch A, and turns off the switch B.

Four switch timing state rows 1112-1118 respectively indicate the state of the switches A to D. In the drawing, the crossed time points of the control signal $V_{CL}$ and the triangle wave control signal $V_{SD}$ are t39 to t46. A triangle wave in any cycle is randomly selected in the drawing, and the cycle of the crossed time points of t40 to t42 of the control signal $V_{CL}$ is taken as an example. One cycle is divided into two intervals, namely, one interval between t40 and t41, $\overline{A}$ is used to indicate that the switch A is OFF, B is used to indicate that the switch B is ON, C is used to indicate that the switch C is ON, and $\overline{D}$ is used to indicate that the switch D is OFF; and one interval between t41 and t42, A is used to indicate that the switch A is ON, $\overline{B}$ is used to indicate that the switch B is OFF, C is used to indicate that the switch C is ON, and $\overline{D}$ is used to indicate that the switch D is OFF. As known from the switching state on the drawing, only the switch A or B performs the switching, in each working cycle, and only two switches have the switching operation.

It should be noted that, although a possible configuration of the control circuit of the multi-mode buck-boost switching regulator is described in the embodiments, those of ordinary skill in the art should know how to design the logic circuit 550 according to the relation among the control signal $V_{CL}$ and the triangle wave control signals $V_{SU}$ and $V_{SD}$, and thus the scope of the present invention is not limited herein.

Figure 12:
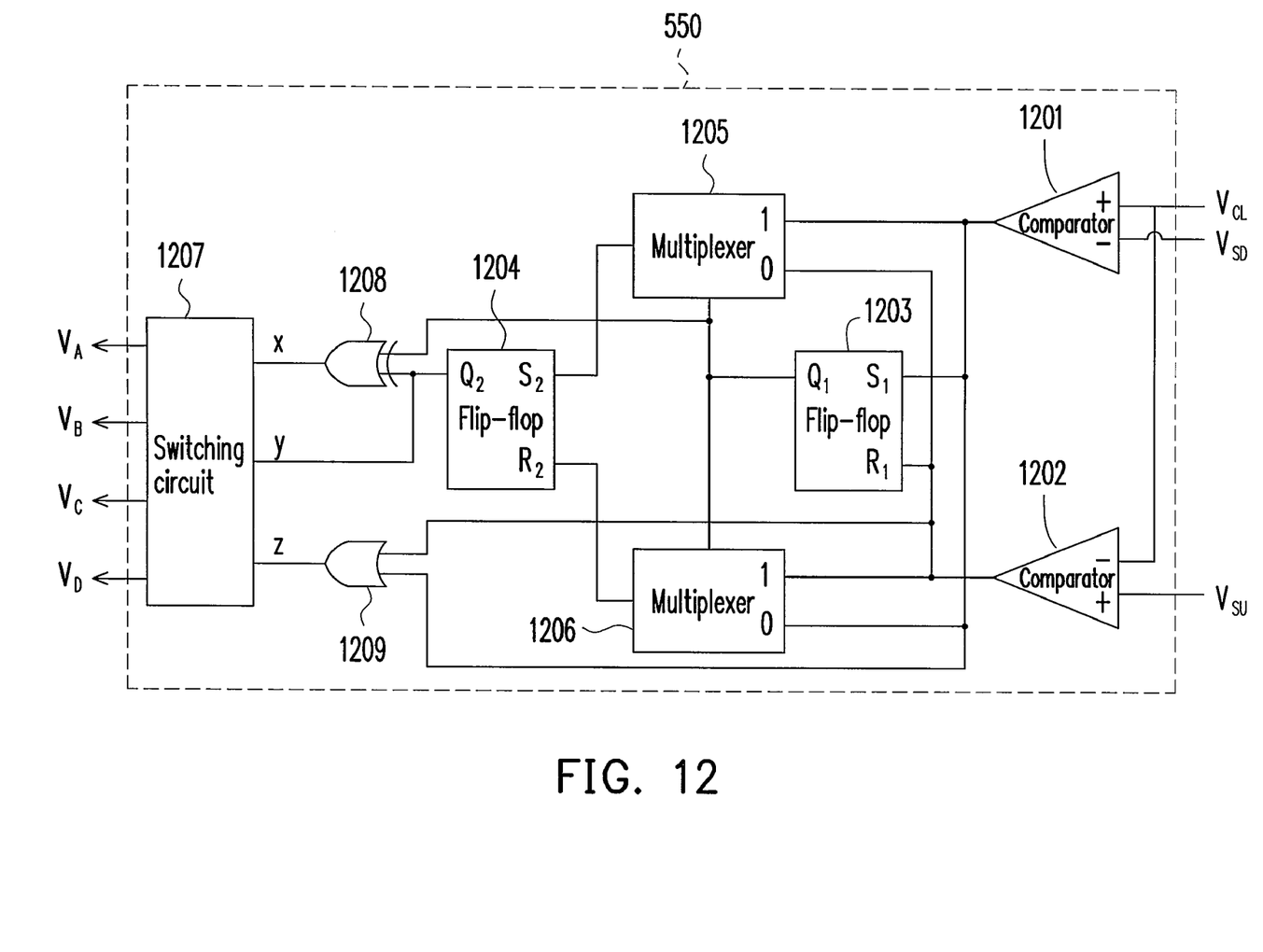
FIG. 12 is a logic circuit diagram of an embodiment of the present invention.

Referring to FIG. 12, FIG. 12 is a logic circuit 550 of an embodiment of the present invention. Two comparators 1201 and 1202, two flip-flops 1203 and 1204, two multiplexers 1205 and 1206, two logic gates 1208 and 1209, and a switching circuit 1207 are used to achieve the function of the logic circuit 550. The logic circuit 550 uses the comparators 1201 and 1202 to compare the relation between the control signal $V_{CL}$ and the triangle wave control signals $V_{SD}$ and $V_{SU}$, so as to determine whether the system operates at the bucking mode or the boosting mode, or the buck-boost mode. As for the logic circuit 550 of this embodiment, except the switching circuit 1207, the other components are standard components of the digital logic circuit, and those of ordinary skill in the art may know the input and output relations of each of the components except the switching circuit 1207, so it will not be described herein any more. The switching circuit 1207 determines the ON state of the switches A, B, C, and D according to the state of the signals x, y, and z. The signals x, y, and z and the ON state of each switch under each operation mode are illustrated as follows.

When the logic circuit 550 shown in FIG. 12 is operated under the boosting mode of FIG. 7, it is constant that the control signal $V_{CL}$ is larger than the triangle wave control signal $V_{SD}$. When the control signal $V_{CL}$ is larger than the triangle wave control signal $V_{SU}$, the signal (x, y, z)=(0, 1, 1), the switching circuit 1207 makes the control signal $V_A$, $V_D$ be at an enabling state, so as to turn on the switches A and D. On the other hand, when the control signal $V_{CL}$ is smaller than the triangle wave control signal $V_{SU}$, the signal (x, y, z)=(1, 0, 1), the switching circuit 1207 makes the control signals $V_A$ ad $V_C$ be at an enabling state, so as to turn on the switches A and C.

When the logic circuit 550 shown in FIG. 12 is operated under the buck-boost mode of FIG. 8, the control signal $V_{CL}$ falls between the maximum value $V_{SDX}$ of the triangle wave control signal $V_{SD}$ and the average value $V_{AVE}$. When the control signal $V_{CL}$ is larger than the triangle wave control signals $V_{SU}$ and $V_{SD}$, the signal (x, y, z)=(0, 1, 1), the switching circuit 1207 makes the control signals $V_A$, $V_D$ be at the enabling state, the switches A and D are turned on. When the control signal $V_{CL}$ is smaller than the triangle wave control signal $V_{SU}$, and larger than the triangle wave control signal $V_{SD}$, the signal (x, y, z)=(1, 0, 1), the switching circuit 1207 makes the control signals $V_A$ and $V_C$ be at the enabling state, and the switches A and C are turned on. When the control signal $V_{CL}$ is smaller than the triangle wave control signal $V_{SD}$, and larger than the triangle wave control signal $V_{SU}$, the signal (x, y, z)=(0, 1, 0), the switching circuit 1207 makes the control signals $V_A$, $V_C$ be at the enabling state, and the switches A and C are turned on.

When the logic circuit 550 shown in FIG. 12 is operated under the buck-boost mode of FIG. 10, the control signal $V_{CL}$ falls between the average value $V_{AVE}$ and the minimum value $V_{SUY}$ of the triangle wave control signal $V_{SU}$. When the control signal $V_{CL}$ is smaller than the triangle wave control signals $V_{SU}$ and $V_{SD}$, the signal (x, y, z)=(1, 1, 1), the switching circuit 1207 makes the control signals $V_B$, $V_C$ be at the enabling state, and the switches B and C are turned on. When the control signal $V_{CL}$ is larger than the triangle wave control signal $V_{SU}$, the signal (x, y, z)=(0, 1, 0), the switching circuit 1207 makes the control signals $V_A$ and $V_C$ be at the enabling state, and the switches A and C are turned on. When the control signal $V_{CL}$ is larger than the triangle wave control signal $V_{SD}$, the signal (x, y, z)=(0, 0, 1), the switching circuit 1207 makes the control signal $V_A$, $V_C$ be at the enabling state, and the switches A and C are turned on.

When the logic circuit 550 shown in FIG. 12 is operated under the bucking mode of FIG. 11, the control signal $V_{CL}$ is smaller than the minimum value $V_{SUY}$ of the triangle wave control signal $V_{SU}$. When the control signal $V_{CL}$ is smaller than the triangle wave control signal $V_{SD}$, the signal (x, y, z)=(1, 1, 1), the switching circuit 1207 makes the control signals $V_B$, $V_C$ be at the enabling state, and the switches B and C are turned on. When the control signal $V_{CL}$ is larger than the triangle wave control signal $V_{SD}$, the signal (x, y, z)=(0, 0, 1), the switching circuit 1207 makes the control signals $V_A$ and $V_C$ be at the enabling state, and the switches A and C are turned on.

In addition to the timing control circuit, the present invention also includes a corresponding controlling method. Those of ordinary skill in the art should easily implement the controlling method of the present invention through the above embodiment of the circuit, so its details are not described here.

It is known from the embodiments that, in the control circuit of the multi-mode buck-boost switching regulator and the method thereof, the control circuit uses two controlling triangle waves and adapts to the load fluctuation, amplifies the error between the voltage division of the output voltage and the reference voltage into the control signal, uses the logic circuit to compare the control signal with the controlling triangle wave, thereby controlling the ON/OFF states of each switch. Since the control signal changes according to the output voltage, the control circuit and the method can adapt to the fluctuation of the load quickly and sensitively. For example, as shown in FIGS. 7 to 11 that the duty cycle of each switch state can be changed in one cycle of the triangle wave, so as to quickly respond to the changes between $V_{IN}$ and $V_{OUT}$. In addition, in each working cycle of each of the operation modes, only two switches are switching at most, which reduces the power consumption of the switching, and increases the efficiency of the regulator (for example, the power conversion efficiency of converting $V_{IN}$ to $V_{OUT}$). The design of the above control circuit is relatively simple, only simple digital elements are required, such as comparators and logic gates, without complicated analog circuits. It is shown in FIGS. 7 to 11 that the power transmission path from $V_{IN}$ to $V_{OUT}$ is used as much as possible (that is, the switches A and C are both turned on), and thus unnecessary power consumption is reduced and the efficiency is increased. Therefore, the present invention combines the advantages of the conventional control circuits and avoids the disadvantages of the convention arts.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit of a multi-mode buck-boost switching regulator, wherein the multi-mode buck-boost switching regulator comprises a first switch, a second switch, a third switch, a fourth switch, an inductor, and a capacitor, the first switch receives an input voltage, the second switch is coupled between the first switch and a ground terminal, the inductor is coupled to the first switch and the second switch, the fourth switch is coupled between the inductor and the ground terminal, the third switch is coupled to the inductor and the fourth switch, the capacitor is coupled between the third switch and the ground terminal, the capacitor provides an output voltage of the multi-mode buck-boost switching regulator, the control circuit comprises:

a comparator, for outputting a control signal according to an error between a feedback voltage and a reference voltage, wherein the feedback voltage is generated according to the output voltage, and the feedback voltage is in direct proportion to the output voltage;

a triangle wave generator, for providing a first triangle wave and a second triangle wave, wherein at a first time point, the first triangle wave is larger than the second triangle wave, and at a second time point, the first triangle wave is smaller than the second triangle wave, the first and the second triangle waves are mutually crossed, the maximum value of the first triangle wave is larger than that of the second triangle wave, the maximum value of the second triangle wave is larger than an average value of the first triangle wave and the second triangle wave, the average value is a DC level and larger than the minimum value of the first triangle wave, and the minimum value of the first triangle wave is larger than that of the second triangle wave; and a logic circuit, for controlling the switching timing of the first switch, the second switch, the third switch, and the fourth switch according to a comparing result between the control signal, the first triangle wave, and the second triangle wave.

2. The control circuit of the multi-mode buck-boost switching regulator as claimed in claim 1, further comprising:

a voltage-dividing circuit, for receiving the output voltage, and providing a voltage division of a preset ratio of the output voltage as the feedback voltage.

3. The control circuit of the multi-mode buck-boost switching regulator as claimed in claim 1, wherein the comparator amplifies the error between the feedback voltage and the reference voltage and outputs the amplified error as the control signal.

4. The control circuit of the multi-mode buck-boost switching regulator as claimed in claim 1, wherein the cycle of the first triangle wave is the same as the cycle of the second triangle wave.

5. The control circuit of the multi-mode buck-boost switching regulator as claimed in claim 1, wherein the slope of the first triangle wave is a positive value, and the slope of the second triangle wave is a negative value.

6. The control circuit of the multi-mode buck-boost switching regulator as claimed in claim 1, wherein if the control signal is larger than the average value, the logic circuit turns on the first switch, turns off the second switch, and makes the third switch and the fourth switch to alternately switch between ON and OFF;

if the control signal is equal to the average value, the logic circuit turns on the first switch and the third switch, and turns off the second switch and the fourth switch;

if the control signal is smaller than the average value, the logic circuit turns on the third switch, turns off the fourth switch, and makes the first switch and the second switch to alternately switch between ON and OFF.

7. The control circuit of the multi-mode buck-boost switching regulator as claimed in claim 6, wherein under the circumstance that the control signal is larger than the maximum value of the second triangle wave, if the control signal is larger than the first triangle wave, the logic circuit turns on the fourth switch, and turns off the third switch;

if the control signal is smaller than the first triangle wave, the logic circuit turns on the third switch, and turns off the fourth switch.

8. The control circuit of the multi-mode buck-boost switching regulator as claimed in claim 6, wherein under the circumstance that the control signal is between the maximum value of the second triangle wave and the average value, if the control signal is larger than the first triangle wave and the second triangle wave, the logic circuit turns on the fourth switch, and turns off the third switch;

if the control signal is smaller than the first triangle wave or the second triangle wave, the logic circuit turns on the third switch, and turns off the fourth switch.

9. The control circuit of the multi-mode buck-boost switching regulator as claimed in claim 6, wherein under the circumstance that the control signal is between the average value and the minimum value of the first triangle wave, if the control signal is smaller than the first triangle wave and the second triangle wave, the logic circuit turns on the second switch, and turns off the first switch;

if the control signal is larger than the first triangle wave or the second triangle wave, the logic circuit turns on the first switch, and turns off the second switch.

10. The control circuit of the multi-mode buck-boost switching regulator as claimed in claim 6, wherein under the circumstance that the control signal is smaller than the minimum value of the first triangle wave, if the control signal is smaller than the second triangle wave, the logic circuit turns on the second switch, and turns off the first switch;

if the control signal is larger than the second triangle wave, the logic circuit turns on the first switch, and turns off the second switch.

11. A method of controlling a multi-mode buck-boost switching regulator, wherein the multi-mode buck-boost switching regulator comprises a first switch, a second switch, a third switch, a fourth switch, an inductor, and a capacitor, the first switch receives an input voltage, the second switch is coupled between the first switch and a ground terminal, the inductor is coupled to the first switch and the second switch, the fourth switch is coupled between the inductor and the ground terminal, the third switch is coupled to the inductor and the fourth switch, the capacitor is coupled between the third switch and the ground terminal, the capacitor provides an output voltage of the multi-mode buck-boost switching regulator, the controlling method comprises:

generating a control signal according to an error between a feedback voltage and a reference voltage, wherein the feedback voltage is generated according to the output voltage, and the feedback voltage is in direct proportion to the output voltage;

providing a first triangle wave and a second triangle wave, wherein at a first time point, the first triangle wave is larger than the second triangle wave, and at a second time point, the first triangle wave is smaller than the second triangle wave, the first and the second triangle waves are mutually crossed, the maximum value of the first triangle wave is larger than that of the second triangle wave, the maximum value of the second triangle wave is larger than an average value of the first triangle wave and the second triangle wave, the average value is a DC level and larger than the minimum value of the first triangle wave, and the minimum value of the first triangle wave is larger than that of the second triangle wave; and controlling the switching timing of the first switch, the second switch, the third switch, and the fourth switch according to a comparing result between the control signal, the first triangle wave, and the second triangle wave.

12. The method of controlling the multi-mode buck-boost switching regulator as claimed in claim 11, wherein the cycle of the first triangle wave is the same as that of the second triangle wave.

13. The method of controlling the multi-mode buck-boost switching regulator as claimed in claim 11, wherein the slope of the first triangle wave is a positive value, and the slope of the second triangle wave is a negative value.

14. The method of controlling the multi-mode buck-boost switching regulator as claimed in claim 11, further comprising:

turning on the first switch, turning off the second switch, and making the third switch and the fourth switch to alternately switch between ON and OFF, if the control signal is larger than the average value;

turning on the first switch and the third switch, and turning off the second switch and the fourth switch, if the control signal is equal to the average value;

turning on the third switch, turning off the fourth switch, and making the first switch and the second switch to alternately switch between ON and OFF, if the control signal is smaller than the average value.

15. The method of controlling the multi-mode buck-boost switching regulator as claimed in claim 14, wherein if the control signal is larger than the maximum value of the second triangle wave, the controlling method further comprises:

turning on the fourth switch, and turning off the third switch, if the control signal is larger than the first triangle wave;

turning on the third switch, and turning off the fourth switch, if the control signal is smaller than the first triangle wave.

16. The method of controlling the multi-mode buck-boost switching regulator as claimed in claim 14, wherein if the control signal is between the maximum value of the second triangle wave and the average value, the controlling method further comprises:

turning on the fourth switch, and turning off the third switch, if the control signal is larger than the first triangle wave and the second triangle wave;

turning on the third switch, and turning off the fourth switch, if the control signal is smaller than the first triangle wave or the second triangle wave.

17. The method of controlling the multi-mode buck-boost switching regulator as claimed in claim 14, wherein if the control signal is between the average value and the minimum value of the first triangle wave, the controlling method further comprises:

turning on the second switch, and turning off the first switch, if the control signal is smaller than the first triangle wave and the second triangle wave;

turning on the first switch, and turning off the second switch, if the control signal is larger than the first triangle wave or the second triangle wave.

18. The method of controlling the multi-mode buck-boost switching regulator as claimed in claim 14, wherein if the control signal is smaller than the minimum value of the first triangle wave, the controlling method further comprises:

turning on the second switch, and turning off the first switch, if the control signal is smaller than the second triangle wave;

turning on the first switch, and turning off the second switch, if the control signal is larger than the second triangle wave.

19. A multi-mode buck-boost switching regulator, comprising:

a first switch, a second switch, a third switch, a fourth switch, an inductor, and a capacitor, wherein the first switch receives an input voltage, the second switch is coupled between the first switch and a ground terminal, the inductor is coupled to the first switch and the second switch, the fourth switch is coupled between the inductor and the ground terminal, the third switch is coupled to the inductor and the fourth switch, the capacitor is coupled between the third switch and the ground terminal, the capacitor provides an output voltage of the multi-mode buck-boost switching regulator; and a control circuit, comprising:

a comparator, for outputting a control signal according to an error between a feedback voltage and a reference voltage, wherein the feedback voltage is generated according to the output voltage;

a triangle wave generator, for providing a first triangle wave and a second triangle wave, wherein at a first time point, the first triangle wave is larger than the second triangle wave, and at a second time point, the first triangle wave is smaller than the second triangle wave, the first and the second triangle waves are mutually crossed, the maximum value of the first triangle wave is larger than that of the second triangle wave, the maximum value of the second triangle wave is larger than an average value of the first triangle wave and the second triangle wave, the average value is a DC level and larger than the minimum value of the first triangle wave, and the minimum value of the first triangle wave is larger than that of the second triangle wave; and a logic circuit, for controlling the switching timing of the first switch, the second switch, the third switch, and the fourth switch according to a comparing result between the control signal, the first triangle wave, and the second triangle wave.

* * * * *